United States Patent
Li et al.

(10) Patent No.: US 12,254,143 B2
(45) Date of Patent: Mar. 18, 2025

(54) ELECTRONIC DEVICE SCREEN CONTROL METHOD, READABLE MEDIUM, AND ELECTRONIC DEVICE

(71) Applicant: Huawei Technologies Co., Ltd., Shenzhen (CN)

(72) Inventors: Jiawen Li, Xi'an (CN); Baiping Jin, Shenzhen (CN); Mingdong Song, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/548,519

(22) PCT Filed: Feb. 25, 2022

(86) PCT No.: PCT/CN2022/077977
§ 371 (c)(1),
(2) Date: Aug. 31, 2023

(87) PCT Pub. No.: WO2022/183985
PCT Pub. Date: Sep. 9, 2022

(65) Prior Publication Data
US 2024/0168573 A1 May 23, 2024

(30) Foreign Application Priority Data
Mar. 3, 2021 (CN) .......................... 202110236124.X

(51) Int. Cl.
G06F 3/0354 (2013.01)
G06F 3/038 (2013.01)

(52) U.S. Cl.
CPC .......... G06F 3/03547 (2013.01); G06F 3/038 (2013.01)

(58) Field of Classification Search
CPC ...... G06F 1/163; G06F 1/1643; G06F 1/3206; G06F 1/3256; G06F 1/3287;
(Continued)

(56) References Cited

U.S. PATENT DOCUMENTS

2010/0156851 A1* 6/2010 Kurokawa ............ G06F 3/0412
345/207
2014/0191991 A1* 7/2014 Flowers ................ G06F 1/3293
345/173
(Continued)

FOREIGN PATENT DOCUMENTS

| CN | 105005412 A | 10/2015 |
|---|---|---|
| CN | 105700668 A | 6/2016 |

(Continued)

*Primary Examiner* — Ryan A Lubit
(74) *Attorney, Agent, or Firm* — Conley Rose, P.C.

(57) ABSTRACT

A method includes a second processor of an electronic device processing related information of a display screen and a touch pad. The electronic device switches, when detecting that a user starts a first touch operation, processing permission of the display screen from the second processor to a first processor, and sends first touch data of the detected first touch operation to the first processor through the second processor. The electronic device switches, when detecting that the first touch operation ends, processing permission of the touch pad from the second processor to the first processor.

20 Claims, 10 Drawing Sheets

(58) Field of Classification Search
CPC .... G06F 1/3293; G06F 3/03547; G06F 3/038; G06F 3/0412; G06F 3/0416
See application file for complete search history.

(56) References Cited

U.S. PATENT DOCUMENTS

| | | | | |
|---|---|---|---|---|
| 2014/0201305 | A1* | 7/2014 | Dalal | H04L 47/56 709/212 |
| 2014/0351617 | A1* | 11/2014 | Connell | G06F 1/3265 713/323 |
| 2015/0277545 | A1* | 10/2015 | Flowers | G06F 3/0488 713/323 |
| 2015/0378413 | A1* | 12/2015 | Tomoda | H04N 21/43635 713/340 |
| 2016/0041593 | A1* | 2/2016 | Dharawat | G06F 1/3215 713/323 |
| 2016/0109934 | A1* | 4/2016 | Woo | G06F 1/3265 345/211 |
| 2016/0219000 | A1* | 7/2016 | Park | H04L 51/046 |
| 2017/0075316 | A1* | 3/2017 | Berdinis | G06F 1/163 |
| 2017/0177207 | A1 | 6/2017 | Ahmed et al. | |
| 2018/0365086 | A1 | 12/2018 | Zhong et al. | |
| 2020/0133383 | A1* | 4/2020 | Ahlström | G06F 1/324 |

FOREIGN PATENT DOCUMENTS

| | | |
|---|---|---|
| CN | 108369445 A | 8/2018 |
| CN | 110908496 A | 3/2020 |

\* cited by examiner

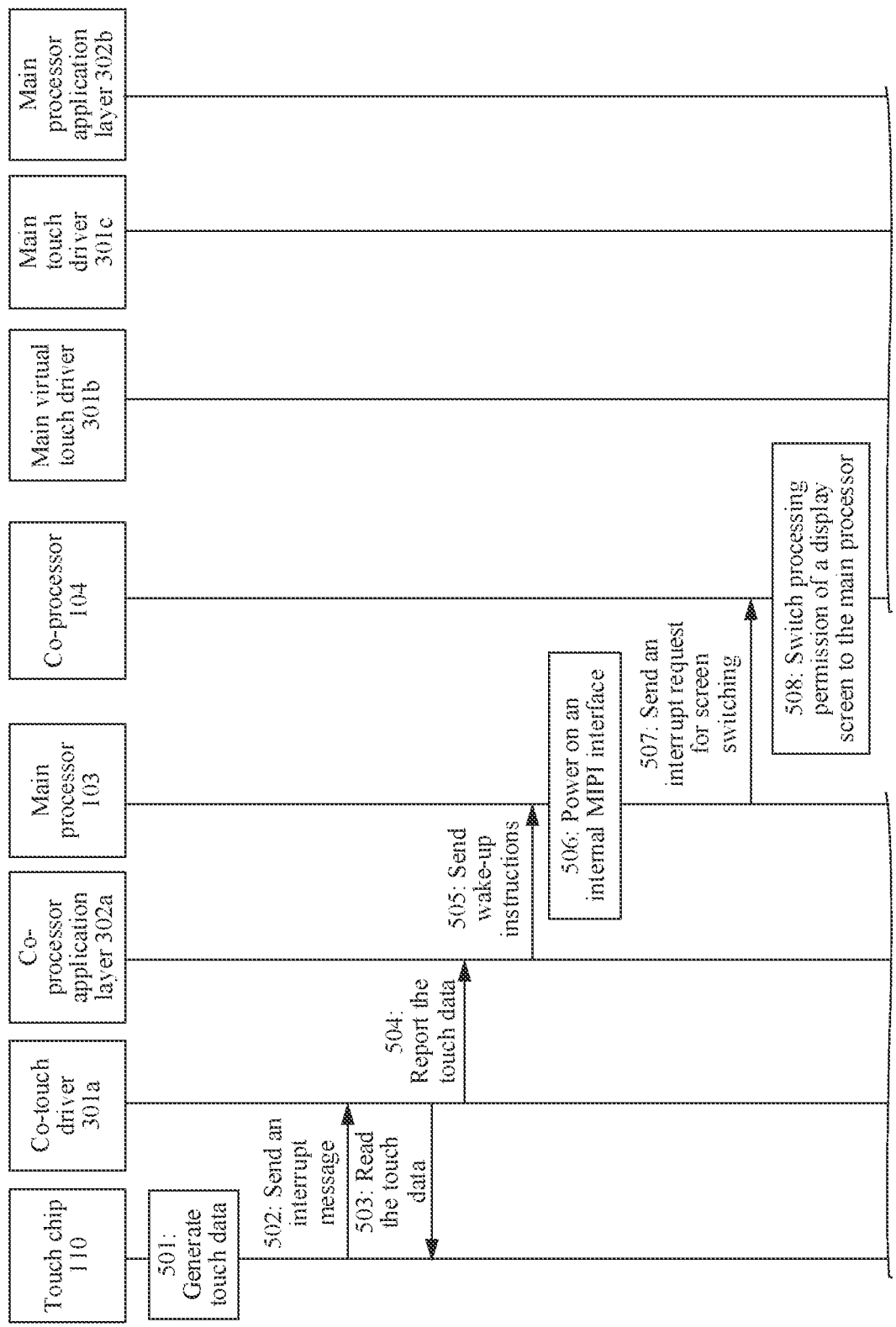

ELECTRONIC DEVICE SCREEN CONTROL METHOD, READABLE MEDIUM, AND ELECTRONIC DEVICE

This is a National Stage of International Patent Application No. PCT/CN2022/077977 filed on Feb. 25, 2022, which claims priority to Chinese Patent Application No. 202110236124.X filed on Mar. 3, 2021. The disclosures of the aforementioned applications are hereby incorporated by reference in their entireties.

TECHNICAL FIELD

This application relates to the field of terminal technologies, and in particular, to an electronic device screen control method, a readable medium, and an electronic device.

BACKGROUND

As a carrier of human-machine interaction, an electronic device touch pad is widely used in various smart electronic devices. A user only needs to touch a touch pad of a smart electronic device with a finger, to perform operations on the electronic device, so that more intuitive and convenient human-machine interaction is implemented.

To achieve a higher energy efficiency ratio, a dual-processor solution is usually used in a hardware architecture of an electronic device. To be specific, a high-performance main processor is responsible for running an operating system and processing a task requiring a large amount of calculations, for example, a map, navigation, or a phone function. A low-power-consumption co-processor is responsible for some tasks requiring a small amount of calculations, such as sensor data collection and processing. In this way, because the high-performance main processor and the low-power-consumption co-processor share a set of a display screen and a touch pad, problems such as point loss and freezing on a user interface may be easily caused during switching between systems.

SUMMARY

Embodiments of this application provide an electronic device screen control method, a readable medium, and an electronic device. In this application, during a screen switching process, processing permission of a display screen is first switched, and the processing permission of a touch pad is switched after the display screen switching is completed. In addition, in a process of switching the touch pad, a first processor receives touch data through a second processor, so that the first processor can receive complete touch data, to accurately parse out a current operation event of a user corresponding to the complete touch data, and then accurately respond to the current operation event of the user. This prevents data that is generated by the electronic device and that corresponds to a user operation from being lost in the screen switching process, to avoid a problem of a sliding experience that is not smooth for the user. Imperceptible switching is implemented, and user experience is improved.

According to a first aspect, an embodiment of this application provides an electronic device screen control method, including:

A second processor of the electronic device processes related information of a display screen and a touch pad. The electronic device switches, when detecting that a user starts a first touch operation, processing permission of the display screen from the second processor to a first processor, and sends first touch data of the detected first touch operation to the first processor through the second processor. The electronic device switches, when detecting that the first touch operation ends, processing permission of the touch pad from the second processor to the first processor.

The related information of the display screen and the touch pad includes but is not limited to: one or more types of data, for example, touch data corresponding to a user touch operation; one or more types of instructions, for example, in an embodiment according to FIG. 5A, wake-up instructions sent by a co-processor application layer to a main processor; one or more types of messages, for example, in an embodiment according to FIG. 5A, an interrupt message sent by a touch chip to the co-touch driver; one or more types of notifications, one or more types of requests, one or more types of responses, one or more types of signals, and the like.

For example, in some embodiments, when the electronic device is in a dormant state, the second processor processes the related information of the display screen and the touch pad. When detecting that the user starts to slide on the screen, the electronic device switches the processing permission of the display screen from the second processor to the first processor, and sends the first touch data of the detected first touch operation to the first processor through the second processor. In addition, when detecting that a finger of the user leaves the screen, the electronic device determines that the current touch operation of the user ends, and switches the processing permission of the touch pad from the second processor to the first processor. In addition, in the process of switching the touch pad, the first processor receives the touch data through the second processor, so that the first processor can receive complete touch data, to accurately parse out a current operation event of the user corresponding to the complete touch data, and then accurately respond to the current operation event of the user. Imperceptible switching is implemented, and user experience is improved.

It should be understood that: in this document, "processing permission of the display screen" refers to the processing permission of the information related to the display screen, and "processing permission of the touch pad" refers to the processing permission of the information related to the touch pad.

In a possible implementation of the first aspect, the method further includes: The electronic device includes a virtual touch driver. The electronic device sends the first touch data of the first touch operation to the virtual touch driver through the second processor, and the first processor receives the first touch data through the virtual touch driver.

In some embodiments, the first processor is a main processor that may run a high-performance operating system, and process a task featuring a low use frequency and a large amount of calculations. For example, the main processor runs a Harmony® system, and supports functions including navigation, phone call, map, chat, music playback, and the like.

In some embodiments, the second processor is a co-processor, and may run a lightweight and low-power-consumption system, and process a task featuring a high use frequency and a small amount of calculations. For example, the co-processor runs a lightweight embedded system, is responsible for sensor data collection and processing, and supports functions of time displaying, a calculator, a timer, an alarm clock, heart rate measurement, step counting, height measurement, and the like.

In some embodiments, the virtual touch driver is a main virtual touch driver in an embodiment according to FIG. 3. When the processing permission of the display screen has been switched to the main processor, and the processing permission of the touch pad is still in the co-processor, the main processor reads, through the main virtual touch driver, the touch data sent by the co-processor.

In a possible implementation of the first aspect, the method further includes: the electronic device switches, when detecting that a user starts a first touch operation, processing permission of the display screen from the second processor to the first processor includes:

The electronic device sends, when detecting that the user starts the first touch operation, wake-up instructions to the first processor through the second processor. The first processor sends, after receiving the wake-up instructions, a screen switching interrupt request to the second processor in response to the wake-up instructions. The second processor switches, after receiving the screen switching interrupt request, the processing permission of the display screen from the second processor to the first processor in response to the interrupt request.

In some embodiments, the first processor is a main processor, the second processor is a co-processor, and the electronic device sends the wake-up instructions to the main processor through the co-processor application layer.

In a possible implementation of the first aspect, the method further includes:

The first processor of the electronic device processes related information of the display screen and the touch pad. The electronic device switches, when detecting that the user performs an interaction operation on a specified application of the electronic device, the processing permission of the display screen and the touch pad from the first processor to the second processor, and the second processor of the electronic device processes the related information of the display screen and the touch pad.

The specified application refers to an application that needs to be processed by the second processor and that features a high use frequency and a small amount of calculations, such as a calculator, a timer, an alarm clock, or an exercise application. The second processor replaces the first processor to process an application that is frequently used and that is used for a long time, so that power consumption can be reduced, and a battery life of the electronic device can be improved.

In a possible implementation of the first aspect, the method further includes: the electronic device switches, when detecting that the user performs an interaction operation on a specified application of the electronic device, the processing permission of the display screen and the touch pad from the first processor to the second processor, and the second processor of the electronic device processes the related information of the display screen and the touch pad includes:

The electronic device switches, when detecting that the user performs the interactive operation on the specified application of the electronic device processing permission of the display screen from the first processor to the second processor. The electronic device switches, after determining that the processing permission of the display screen is switched from the first processor to the second processor, the processing permission of the touch pad from the first processor to the second processor.

In this way, loss of the user touch data in the screen switching process can be avoided, to implement imperceptible switching, and improve user experience.

In a possible implementation of the first aspect, the method further includes: The first processor of the electronic device processes related information of the display screen and the touch pad. The electronic device sends, when detecting that the user starts the second touch operation, the second touch data of the detected second touch operation to the first processor.

For example, in some embodiments, the first processor that is currently running the electronic device controls the display screen and the touch pad. When a finger of the user slides on the screen of the electronic device, the first processor reads the touch data that is generated by the touch chip and that is corresponding to the current touch operation of the user.

In a possible implementation of the first aspect, the method further includes: The electronic device includes a display screen switching switch. The display screen switching switch is electrically connected to the display screen. The electronic device switches, when detecting that the user starts the first touch operation, the processing permission of the display screen from the second processor to the first processor in the following manner:

The electronic device controls, when detecting that the user starts the first touch operation, the display screen switching switch to disconnect from the second processor, and controls the display screen switching switch to communicate with the first processor.

For example, in some embodiments, MIPI interfaces of the first processor and of the second processor are connected to the MIPI interfaces of the display screen through a switch S2. The electronic device controls, when detecting that the user starts the first touch operation, the switch S2 to disconnect from the second processor, and controls the switch S2 to communicate with the first processor.

In a possible implementation of the first aspect, the method further includes: The electronic device includes a touch pad switching switch. The touch pad switching switch is electrically connected to the touch pad. The electronic device switches, when detecting that the first touch operation ends, the processing permission of the touch pad from the second processor to the first processor in the following manner:

The electronic device controls, when detecting that the first touch operation ends, the touch pad switching switch to disconnect from the second processor, and controls the touch pad switching switch to communicate with the first processor.

For example, in some embodiments, I2C interfaces of the first processor and of the second processor are connected to the I2C interfaces of the touch pad through a switch S1. When detecting that the first touch operation ends, the electronic device controls the switch S1 to disconnect from the second processor, and controls the switch S1 to communicate with the first processor.

According to a second aspect, an embodiment of this application provides a readable medium, where the readable medium stores instructions, and the instructions when executed on an electronic device, cause the electronic device to perform any one of screen control methods according to the first aspect or any one of possible implementations of the first aspect.

According to a third aspect, an embodiment of this application provides an electronic device, including:
　　a screen, where the screen includes a display screen and
　　　a touch pad;
　　a memory, configured to store instructions executed by
　　　one or more processors of the electronic device;

a first processor, one of the processors of the electronic device; and a second processor, one of the processors of the electronic device, and configured to cooperate with the first processor to perform any one of screen control methods according to the first aspect or any one of the possible implementations of the first aspect.

BRIEF DESCRIPTION OF DRAWINGS

FIG. 5A and FIG. 5B are an interaction diagram of a screen switching control method provided in this application according to some embodiments of this application;

DESCRIPTION OF EMBODIMENTS

Embodiments of this application include but are not limited to an electronic device screen control method, a readable medium, and an electronic device.

To resolve a problem of data loss and freezing on a screen when a dual-processor electronic device switches a screen, an embodiment of this application provides a screen control method for an electronic device. Specifically, when the electronic device switches a system in some scenarios, processing permission of a display screen is first switched, and the processing permission of a touch pad is switched after the display screen switching is completed. For example, provided that the electronic device is the dual-processor device with a main processor and a co-processor, and the user wears the electronic device on a wrist. When the user lifts the wrist on which the electronic device is worn, the co-processor of the electronic device is woken up, and the co-processor controls the display screen and the touch pad. When a finger of the user slides on the screen of the electronic device, the electronic device first switches the processing permission of the display screen to the main processor, and after the current sliding operation of the user is completed, the electronic device switches the processing permission of the touch pad to the main processor.

Figure 1A:
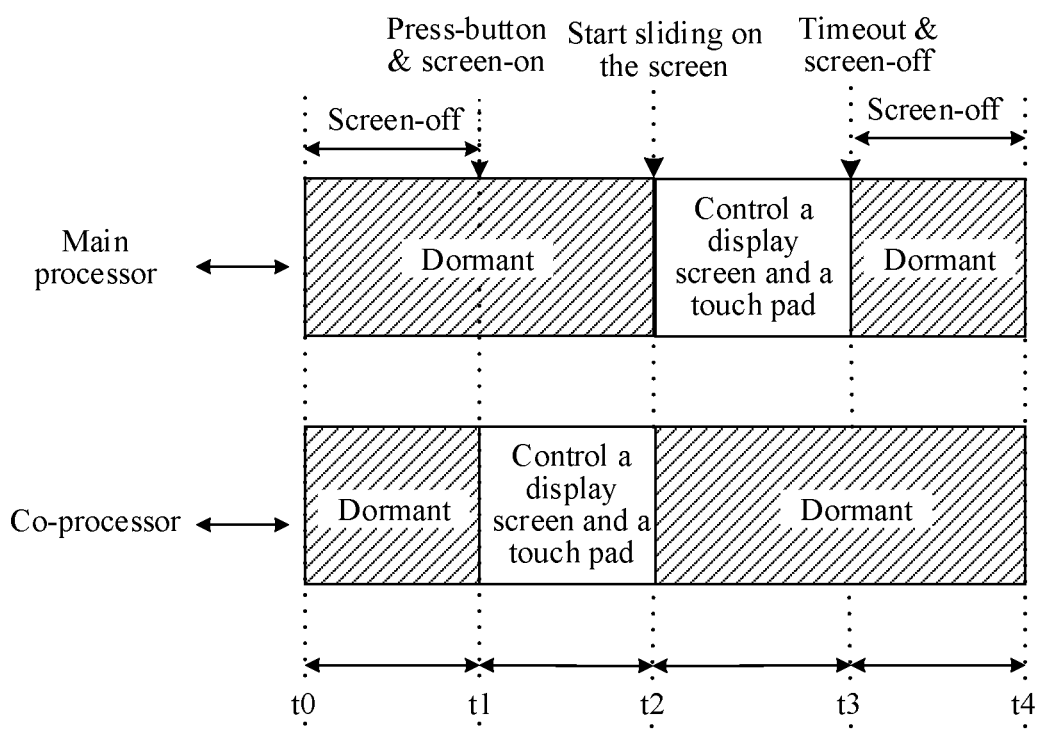
FIG. 1A is a sequence diagram of one screen switching of an electronic device in a related technical solution.

In a related technical solution, as shown in FIG. 1A, at a moment t1, after an electronic device in a screen-off state receives a press-button operation of a user, a co-processor is woken up, and the co-processor controls a display screen and a touch pad; at a moment t2, when a finger of the user starts to slide on a screen of the electronic device, the electronic device simultaneously switches processing permission of both the display screen and the touch pad to a main processor, and the main processor controls the display screen and the touch pad. In this way, when a complete touch operation of the user is not completed, the electronic device switches the processing permission of related information of the touch pad from the co-processor to the main processor. As a result, touch data of the user is partially lost in the touch pad switching process, so that the main processor cannot completely receive the touch data, and therefore cannot accurately parse out a user operation event corresponding to the user touch data, and further cannot accurately respond to the user operation event. Consequently, freezing on a screen occurs in the screen switching process, affecting user experience.

Figure 1B:
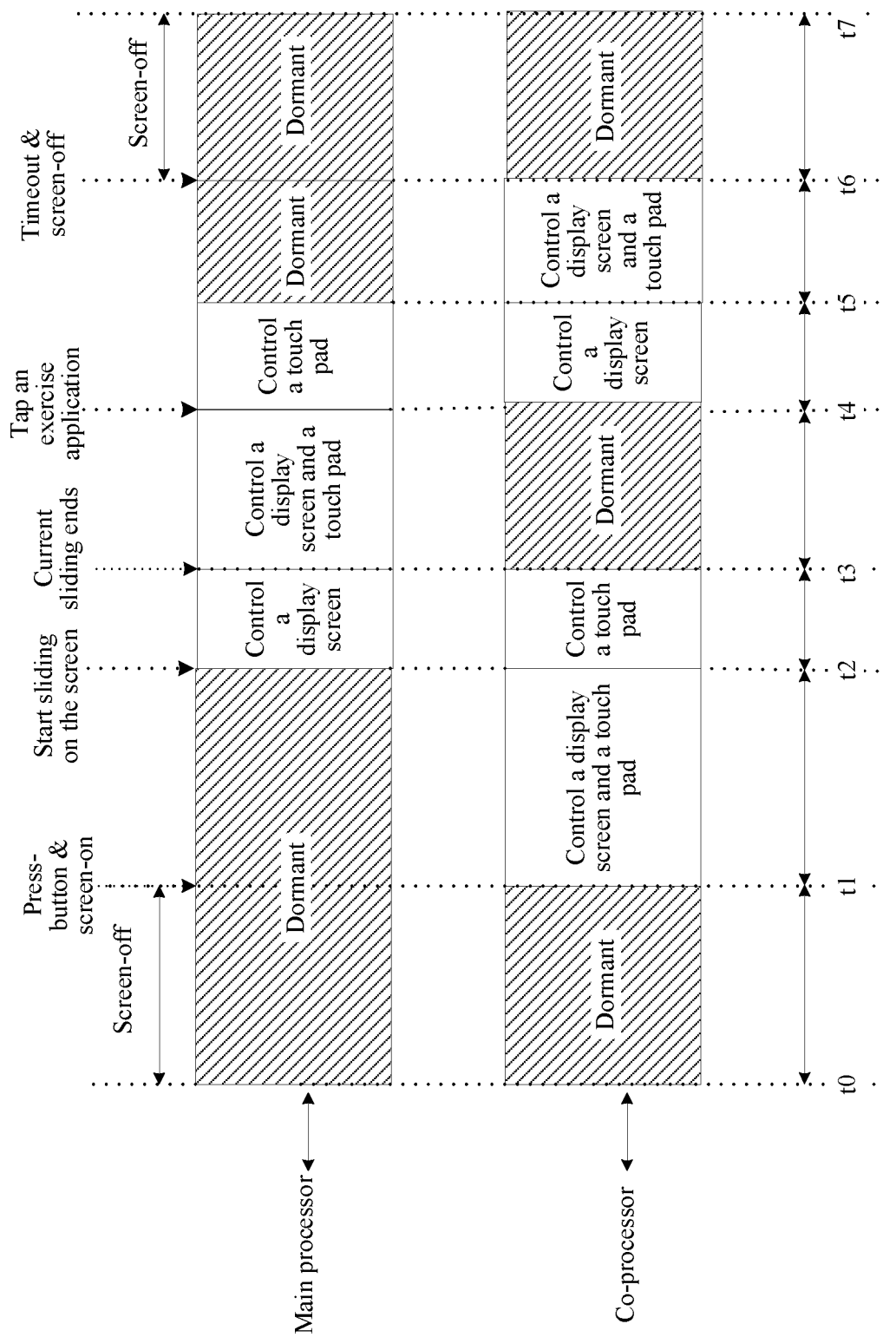
FIG. 1B is a sequence diagram of one screen switching of an electronic device when the electronic device performs a screen switching control method provided in this application according to some embodiments of this application.

However, in some embodiments of this application, as shown in FIG. 1B, at the moment t1, after an electronic device in a screen-off state receives a press-button operation of a user, a co-processor is woken up, and the co-processor controls a display screen and a touch pad; at the moment t2, when a finger of a user starts to slide on a screen of the electronic device, a main processor is woken up. The electronic device first switches processing permission of the display screen to the main processor, so the main processor controls the display screen, and processing permission of the touch pad is still in the co-processor; and at a moment t3, when the finger of the user is lifted from the screen of the electronic device, to be specific, after the current sliding operation ends, the electronic device switches the processing permission of the touch pad to the main processor.

It should be noted that: In some embodiments of this application, when the processing permission of the display screen is switched to the main processor, and the processing permission of the touch pad remains in the co-processor, the electronic device creates a virtual driver corresponding to the touch pad in the main processor. (To simplify the description, hereinafter referred to as the main virtual touch driver) to receive touch data sent by the co-processor. When the main processor has started to control the display screen to display images frame by frame, but the touch pad has not completed switching, the main processor may receive, through the main virtual touch driver, the complete touch data corresponding to the current touch operation of the user. In this way, the main processor can accurately parse out, based on the received complete touch data, a current operation event of the user corresponding to the complete touch data, and then accurately respond to the current operation event of the user. This prevents data that is generated by the electronic device and that corresponds to a user operation from being lost in the system switching process, to avoid a problem of a sliding experience that is not smooth for the user. Insensible switching is implemented, and user experience is improved.

It can be understood that, when the processing permission of the touch pad is in the main processor, the main processor is responsible for processing the touch data that is generated by the electronic device and that corresponds to the touch operation of the user; and when the processing permission of the touch pad is in the co-processor, the co-processor is responsible for processing the touch data that is generated by the electronic device and that corresponds to the touch operation of the user.

Embodiments of this application are further described in detail below with reference to the accompanying drawings.

Figure 1C:
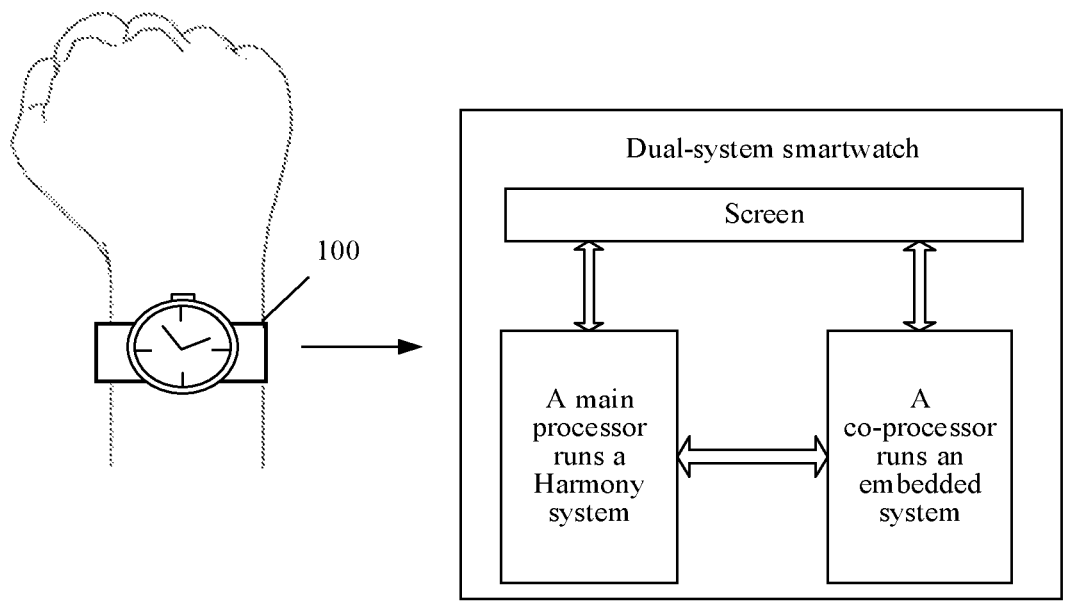
FIG. 1C shows an application scenario of a screen switching control method provided in this application according to some embodiments of this application.

FIG. 1C shows an application scenario of a screen control method according to some embodiments of this application. A dual-processor smartwatch 100 is worn on a left wrist of the user. The smartwatch 100 includes a main processor and a co-processor. The main processor and the co-processor share one screen.

The main processor may run a high-performance operating system, and process a task featuring a low use frequency and a large amount of calculations. For example, the main processor runs a Harmony® system, and supports functions including navigation, phone, map, chat, music playback, and the like. The second processor is a co-processor, and may run a lightweight and low-power-consumption system, and process a task featuring a high use frequency and a small amount of calculations. For example, the co-processor runs a lightweight embedded operating system, is responsible for sensor data collection and processing, and supports functions of time displaying, a calculator, a timer, an alarm clock, heart rate measurement, step counting, height measurement, and the like. A low-power-consumption co-processor replaces the main processor and processes a task featuring a high use frequency and a small amount of calculations, to reduce power consumption and improve a battery life of the smartwatch 100.

In addition, the main processor and the co-processor share one screen, and the screen includes a display screen and a touch pad. In some embodiments, the screen may include a touch pad and a display screen stacked together. Based on a dual-processor hardware architecture, when the smartwatch 100 is in a screen-off state, both the main processor and the co-processor are in a dormant state, and the co-processor controls the display screen and the touch pad; when the co-processor in the dormant state detects a touch operation performed by the user on the touch pad or a press-button operation performed by the user, processing permission of the display screen and the touch pad is switched to the main processor; and In a process in which the main processor controls the display screen and the touch pad, if the main processor detects that the user taps some applications that need to be processed by the co-processor, the processing permission of the display screen and the touch pad is switched to the co-processor.

However, in a related technology, in a process in which processing permission of the display screen and the touch pad is switched between the main processor and the co-processor, some touch data of the user is missing, sliding on the touch pad by the user is not smooth, and the interface displayed to the user freezes.

To resolve the foregoing problems, when the processing permission of the display screen and the processing permission of the touch pad of the smartwatch 100 are switched between the main processor and the co-processor, the smartwatch 100 first switches the processing permission of the display screen according to the screen switching control method provided in this embodiment of this application. The processing permission of the display screen is first switched, and the processing permission of the touch pad is switched after the display screen switching is completed. For example, in a process of switching the processing permission of the display screen and the touch pad from the co-processor to the main processor, the main processor receives, through the main virtual touch driver, the touch data sent by the co-processor. Therefore, in the process of switching the display screen and the touch pad, the smartwatch 100 can obtain the complete data that is generated by the touch pad and that corresponds to the touch operation of the user, to accurately respond to the touch operation of the user and perform a corresponding task. This reduces the overall power consumption of the machine, implement imperceptible switching, and improves user experience.

It may be understood that the technical solutions in this application may be applied to an electronic device that has dual processors, a display screen, and a touch pad. This includes, but is not limited to, a smartwatch, a laptop computer, a desktop computer, a tablet computer, a mobile phone, a server, a wearable device, a head-mounted display, a mobile email device, a portable game console, a portable music player, a reader device, a television that is embedded or coupled with one or more processors, or another electronic device that can access a network.

In the following description, for simplicity of description, the smartwatch 100 is used as an example to describe the technical solutions of this application.

Figure 2:
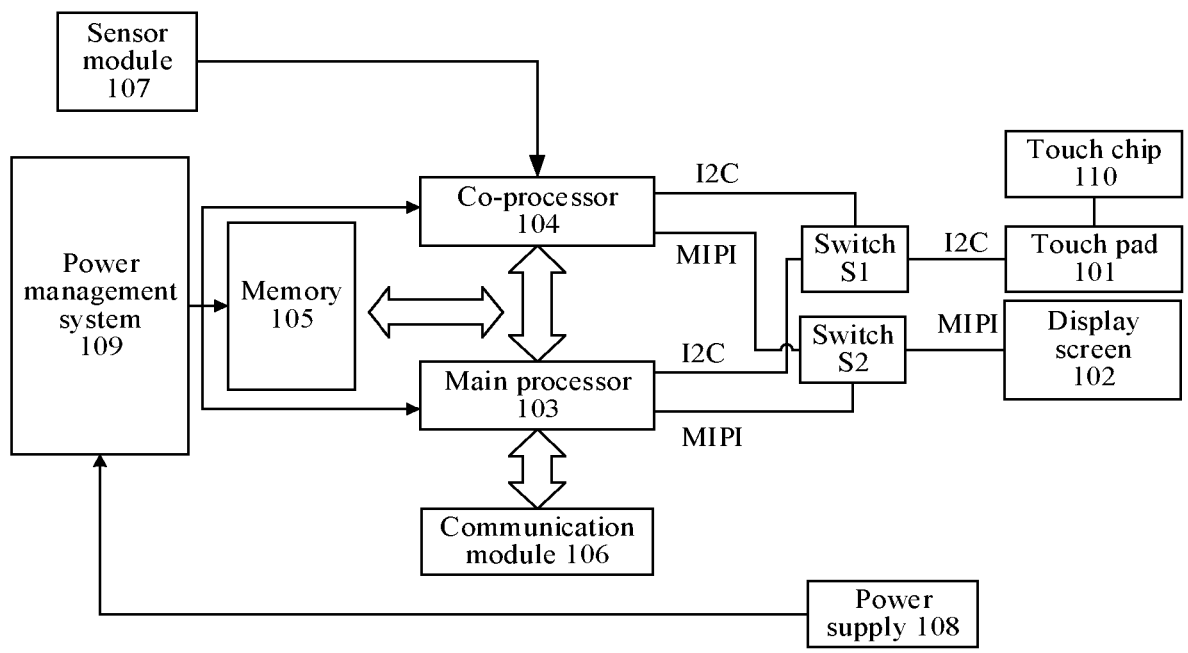
FIG. 2 is a block diagram of a hardware structure of a smartwatch shown in FIG. 1C according to some embodiments of this application.

FIG. 2 is a block diagram of a hardware structure of the smartwatch 100 shown in FIG. 1C according to some embodiments of this application. As shown in FIG. 2, the smartwatch 100 includes a touch pad 101, a display screen 102, a main processor 103, a co-processor 104, a memory 105, a communication module 106, a sensor module 107, a power supply 108, a switching switch S1 of the touch pad 101, a switching switch S2 of the display screen 102, a power management system 109, a touch chip 110, and the like.

The touch pad 101 may also be referred to as a touch panel, and may collect touch operations, such as tapping and sliding, of a user on a screen. In some embodiments, the touch pad 101 may communicate with the main processor 103 and the co-processor 104 through an I2C (Inter-Integrated Circuit) bus. The touch pad 101 may be a resistive type, a surface capacitive type, a projection capacitive type, an infrared type, a surface acoustic wave type, a bending wave type, an active digital switcher type, or an optical imaging type.

The touch chip 110 is electrically connected to the touch pad 101. When the touch pad 101 works, the touch chip 110 scans the touch pad 101 at a specific scanning frequency, to obtain touch data of the user, for example, data such as coordinates, a pressure, an area, and a tangent value of a touch point. Then, the obtained touch data of the user is reported to the main processor 103 or the co-processor 104 for processing. After processing the touch data, the main processor 103 or the co-processor 104 displays an image corresponding to a touch operation of the user frame by frame.

The display screen 102 can be configured to display information entered by the user, prompt information provided for the user, various menus on the smartwatch 100, operation interfaces of various application programs of the smartwatch 100, and the like. For example, the display screen 102 may be configured to display a current time, a heart rate of the user that is measured by the health monitoring application, a quantity of steps calculated by the exercise application when the user exercises, and the like. In some embodiments, the display screen 102 may communicate with the main processor 103 and the co-processor 104 through a mobile industry processor interface (Mobile Industry Processor Interface, MIPI) bus. The display screen 102 may include a display panel, and the display panel may be a liquid crystal display (Liquid Crystal Display, LCD), an organic light-emitting diode (Organic Light-emitting Diode, OLED), an active-matrix organic light-emitting diode (Active-matrix Organic Light-emitting Diode, AMOLED), a flexible light-emitting diode (Flex Light-emitting Diode, FLED), a mini LED, a micro LED, a micro OLED, a quantum dot light-emitting diode (Quantum Dot Light-emitting Diode, QLED), and the like.

The main processor 103 includes a plurality of processing units, may run an operating system such as Android® and Harmony®, configured to process tasks related to applications such as navigation, phone, map, chat, and music playback, and process data generated when the user touches the touch pad 101 when processing permission of the touch pad 101 and the display screen 102 of the smartwatch 100 is switched to the main processor 103, and the like.

The co-processor 104 can run a lightweight embedded operating system, configured to collect and process sensor data, process tasks related to applications such as time display, a calculator, a timer, an alarm clock, heart rate measurement, step counting, and height measurement, and process data of the user touching the touch pad 101 when the processing permission of the touch pad 101 and the display screen 102 of the smartwatch 100 is switched to the co-processor 104, and the like. In some embodiments, the co-processor 104 may include a processing module or processing circuit, such as a digital signal processor (Digital Signal Processor, DSP), a micro-controller unit (Micro-controller Unit, MCU), a field programmable gate array (Field Programmable Gate Array, FPGA), and an application specific integrated circuit (Application Specific Integrated Circuit, ASIC).

In some embodiments, the I2C interfaces of the main processor 103 and the co-processor 104 are connected to the I2C interfaces of the touch pad 101 through the switching switch S1. The MIPI interfaces of the main processor 103 and the co-processor 104 are connected to the MIPI interfaces of the display screen 102 through the switching switch S2. In addition, the main processor 103 and the co-processor 104 are connected to the switching switch S2 through a general-purpose input/output (General-purpose input/output, GPIO) interface (not shown in the figure). The main processor 103 pulls up/down a level of the GPIO interface to send a switch request of the display screen 102 to the co-processor 104, and after the processing permission of the display screen 102 is switched, the processing permission of the touch pad 101 is switched.

The memory 105 is configured to store a software program and data. The processor 203 runs the software program and data stored in the memory 105, to implement various functional applications and data processing of the smartwatch 100. For example, in some embodiments of this application, the memory 105 may store data such as an atmospheric pressure and a temperature that is collected by a sensor during an exercise of the user; and user data such as sleep data and heart rate data is also stored. The memory 105 can also store user information such as registration information and login information.

The communication module 106 can be configured to enable the smartwatch 100 to communicate with another electronic device, and connect to a network through the another electronic device. For example, the smartwatch 100 is connected to an electronic device such as a mobile phone or a server through the communication module 106 for data transmission.

The sensor module 107 may include an optical proximity sensor, a pressure sensor, a gyroscope sensor, a barometric pressure sensor, a magnetic sensor, an acceleration sensor, a distance sensor, a fingerprint sensor, a temperature sensor, a touch sensor, an ambient light sensor, a bone conduction sensor, and the like.

The power supply 108 is configured to supply power to each component of the smartwatch 100. The power supply 108 may be a battery.

The power management system 109 is configured to manage charging of the power supply 108 and supply of power to another module by the power supply 108.

It may be understood that the smartwatch 100 shown in FIG. 2 is merely an example structure to implement functions of the smartwatch 100 in the technical solutions of this application, and constitute no specific limitation on the smartwatch 100. In some other embodiments of this application, the smartwatch 100 may include more or fewer components than those shown in FIG. 2, or some components may be combined, or some components may be split, or components are arranged in different manners. The components shown in FIG. 2 may be implemented by hardware, software or a combination of software and hardware.

Figure 3:
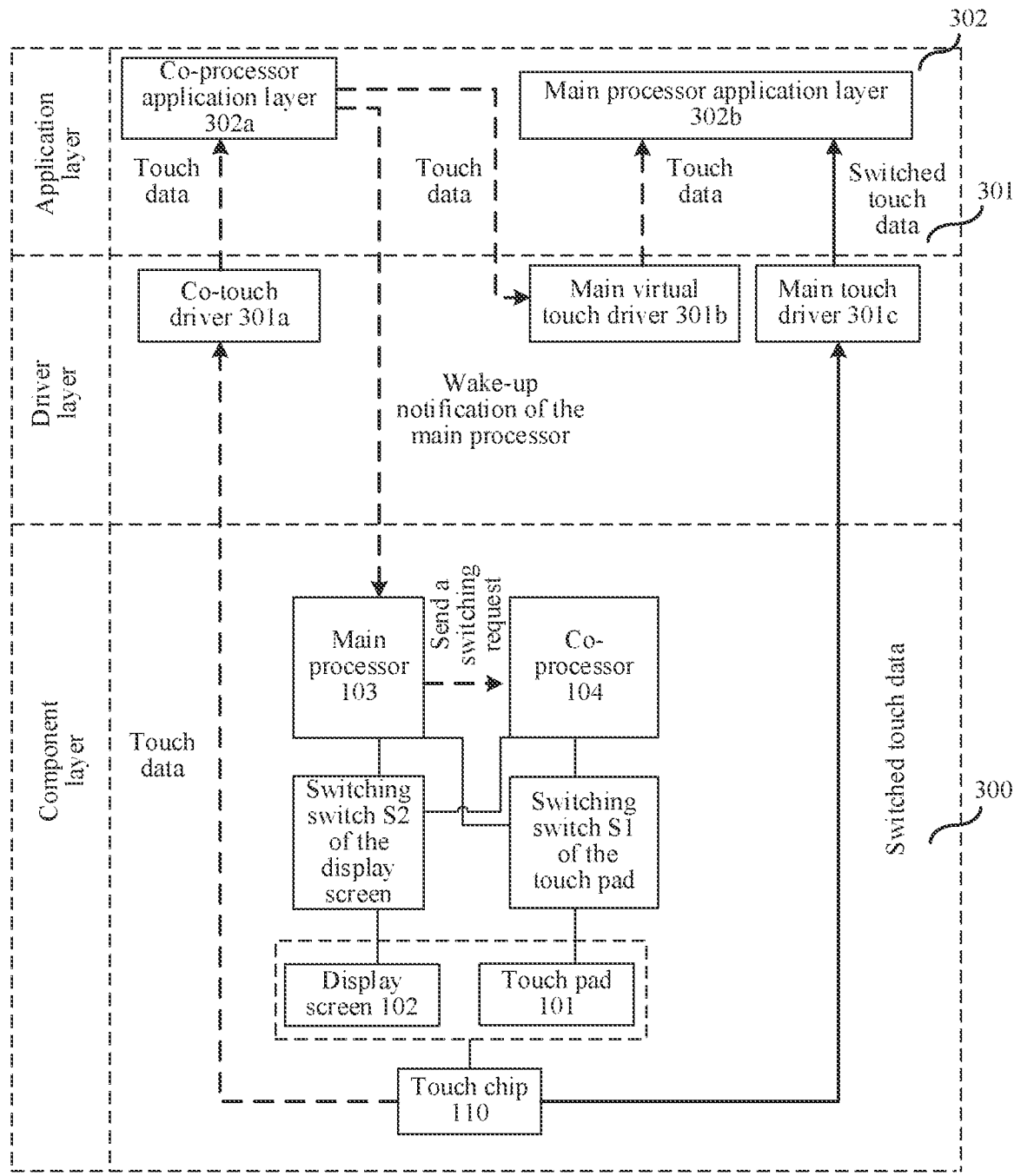
FIG. 3 is a diagram of a system architecture of the smartwatch shown in FIG. 1C according to some embodiments of this application.

FIG. 3 shows, a diagram of architecture of two operating systems controlled by the main processor 103 and the co-processor 104 run in the smartwatch 100 shown in FIG. 2 (for example, a Harmony® system and a lightweight embedded operating system) according to some embodiments of this application. As shown in FIG. 3, two operating systems respectively run by the main processor 103 and the co-processor 104 of the smartwatch 100 both include an application layer 302, a driver layer 301, and a device layer 300. Therefore, no distinction is made herein, but specific originals in each layer are distinguished. The main processor 103 and the co-processor 104 share the display screen 102, the touch pad 101, and the touch chip 110.

As shown in FIG. 3, the device layer 300 includes the display screen 102, the touch pad 101, the switching switch S2 of the display screen 102, the switching switch S1 of the touch pad 101, the main processor 103, the co-processor 104, the touch chip 110, and the like. For functions of each component in the device layer 300, refer to the foregoing text description of FIG. 2. Details are not described herein again.

The driver layer 301 is configured to drive each component at the device layer 300, to implement functions such as read/write access to each component, and interrupt setting.

As shown in FIG. 3, in a lightweight embedded operating system in which the co-processor 104 runs, the driver layer 301 includes but is not limited to a co-touch driver 301a. The co-touch driver 301a may be a software program that is in a lightweight embedded operating system run by the co-processor 104, configured to drive the touch pad 101 and can read touch data generated by the touch chip 110.

For example, in some embodiments shown in FIG. 1B, at the moment t1, after the smartwatch 100 in the screen-off state receives the press-button operation of the user, the co-processor 104 is woken up, and the co-processor 104 processes related information of the display screen 102 and the touch pad 101. Related information of the display screen 102 and the touch pad 101 includes but is not limited to: one or more types of data, for example, touch data corresponding to a user touch operation; one or more types of instructions, for example, in some embodiments according to FIG. 5A, wake-up instructions sent by a co-processor application layer to the main processor 103; one or more types of messages, for example, in some embodiments according to FIG. 5A, an interrupt message sent by the touch chip 110 to the co-touch driver 301a; and one or more types of notifications, one or more types of requests, one or more types of responses, one or more types of signals, and the like. The co-processor 104 drives the touch pad 101 through the co-touch driver 301a, and reads the touch data of the user.

It should be understood that: In this specification, "processing permission of the display screen 102" refers to processing permission of related information of the display screen 101, and "processing permission of the touch pad 101" refers to processing permission of related information of the touch pad 101.

In the Harmony® system in which the main processor 103 runs, the driver layer 301 includes but is not limited to a main virtual touch driver 301b, a main touch driver 301c, and the like that are configured to receive and send the touch data of the user. The main touch driver 301c is a software program that is in a high-performance operating system running in the main processor 103 and that is configured to drive the touch pad 101. In a case when the processing permission of the display screen 102 and the processing permission of the touch pad 101 are both switched to the main processor 103, the main touch driver 301c can read the switched touch data generated by the touch chip 110 as shown in FIG. 3 (to be specific, after the processing permission of the display screen 102 and the touch pad 101 is both switched to the main processor 103, the user touches the screen again, and the touch chip 110 generates data corresponding to the re-touch operation of the user).

The main virtual touch driver 301b is a virtual driver corresponding to the touch pad 101 created by the main processor 103 during initialization, and is configured to: receive touch data transmitted from the co-processor application layer 302a when the processing permission of the display screen 102 has been switched to the main processor 103 and the processing permission of the touch pad 101 is still in the co-processor 104.

For example, in embodiments shown in FIG. 1B, at the moment t2, when the finger of the user starts to slide on the screen of the smartwatch 100, the main processor 103 is woken up, and the smartwatch 100 first switches the processing permission of the display screen 102 to the main processor 103. The main processor 103 processes the data of the display screen 102, and the processing permission of the touch pad 101 is still in the co-processor 104. When the processing permission of the display screen 102 has been switched to the main processor 103, but the processing permission of the touch pad 101 is still in the co-processor 104, the main processor 103 reads, through the main virtual touch driver 301b, the touch data sent by the co-processor 104.

At the moment t3, when the finger of the user is lifted from the screen of the smartwatch 100, to be specific, after the current sliding operation ends, the smartwatch 100 switches the processing permission of the touch pad 101 to the main processor 103. The main processor 103 reads, through the main touch driver 301c, the touch data sent by the co-processor 104.

With continued reference to FIG. 3, in some embodiments, in the lightweight embedded operating system running on the co-processor 104, the application layer 302 includes a co-processor application layer 302a. The co-processor application layer 302a is configured to: when the processing permission of the display screen 102 and the touch pad 101 is in the co-processor 104, perform calculation on the touch data read by the co-touch driver 301a of the co-processor 104 from the touch chip 110, determine a touch event type of a user corresponding to the touch data, and then respond, based on the determined event type, to the application program.

For example, in some embodiments shown in FIG. 1B, at the moment t1, after the smartwatch 100 in the screen-off state receives the press-button operation of the user, the co-processor 104 is woken up, and the co-processor 104 processes related information of the display screen 102 and the touch pad 101. The co-processor 104 drives the touch pad 101 through the co-touch driver 301a, and reads the touch data of the user. The co-processor application layer 302a performs calculation after receiving the touch data of the user that is reported by the co-touch driver 301a, determines the touch event type of the user corresponding to the touch data, and then responds through an application program according to the determined event type.

Correspondingly, in the Harmony® system in which the main processor 103 runs, the application layer 302 includes a main processor application layer 302b. The main processor application layer 302b is configured to: when the processing permission of the display screen 102 and the touch pad 101 is in the main processor 103, perform calculation on the touch data read by the co-touch driver 301c of the main processor 103 from the touch chip 110, determine the touch event type of the user corresponding to the touch data, and then respond, based on the determined event type, through the application program.

For example, in embodiments shown in FIG. 1B, at the moment t2, when the finger of the user starts to slide on the screen of the smartwatch 100, the main processor 103 is woken up, and the smartwatch 100 first switches the processing permission of the display screen 102 to the main processor 103. At the moment t3, when the finger of the user is lifted from the screen of the smartwatch 100, to be specific, after the current sliding operation ends, the smartwatch 100 switches the processing permission of the touch pad 101 to the main processor 103. The main processor 103 processes related information of the display screen 102 and the touch pad 101. When the user taps the screen again, the touch chip 110 generates touch data corresponding to the tap operation of the user. After reading the touch data from the touch chip 110, the main touch driver 301c reports the touch data to the main processor application layer 302b. The main processor application layer 302b identifies the data of the user tapping the screen, determines that the operation of the user is tapping an icon of the music playback application, and further opens the music playback application.

Refer to FIG. 2 to FIG. 6. The following describes in detail a screen control method according to solutions of this application in a scenario in which the smartwatch 100 is in the screen-off state, a user lifts a wrist or presses a button to wake up the co-processor 104, and the user touches the screen through a finger.

Figure 4C:
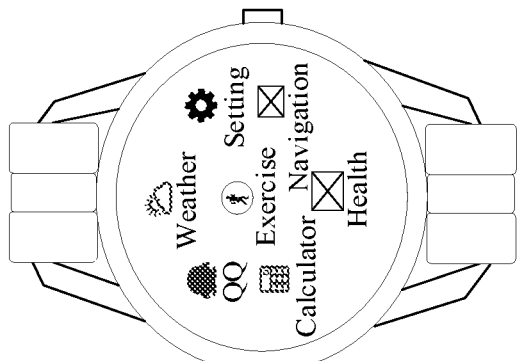
FIG. 4C is a diagram of a desktop displayed by a smartwatch after a user slides a screen according to some embodiments of this application.
Figure 4B:
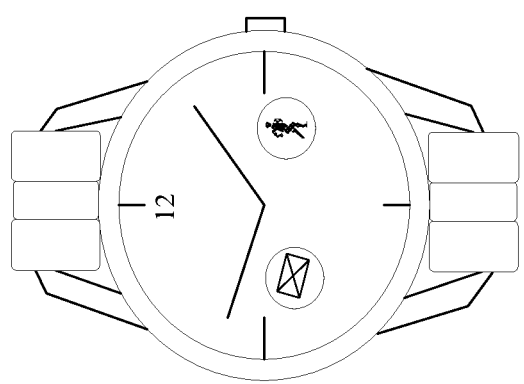
FIG. 4B is a diagram of an interface of a smartwatch of which a screen is turned on after a user lifts a wrist or presses a button according to some embodiments of this application.
Figure 4A:
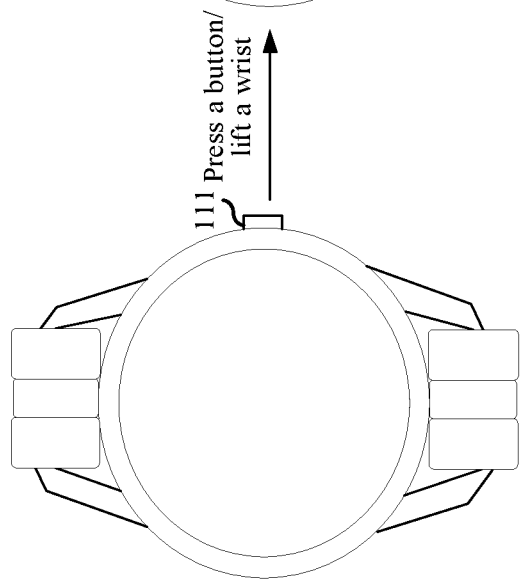
FIG. 4A is a diagram of an interface of a smartwatch in a screen-off state according to some embodiments of this application.

For example, in embodiments shown in FIG. 4A, the smartwatch 100 is in the screen-off state, and both the main processor 103 and the co-processor 104 are in the dormant state. In embodiments shown in FIG. 4B, after the user lifts the wrist or presses the button 111 of the smartwatch 100, the screen lights up, a dial displays a time interface, the co-processor 104 is woken up, and the processing permission of the display screen 102 and the touch pad 101 is in the co-processor 104. The co-processor 104 processes the touch data of the user generated by the touch chip 110. After processing the touch data, the co-processor 104 controls the display screen 102 to display the data frame by frame. After the screen lights up, if no touch operation of the user is detected within a set time, the smartwatch 100 turns off the screen again, and the main processor 103 and the co-processor 104 enter the dormant state again. If the touch operation of the user is detected within the set time, for example, after sliding on the displayed time interface of the smartwatch 100 shown in FIG. 4B, the user enters a desktop of the smartwatch 100 shown in FIG. 4C, where the desktop includes a plurality of application icons, for example, a navigation icon, an exercise application icon, a calculator icon, a weather icon, or a setting icon. In this case, the smartwatch 100 switches the processing permission of the display screen 102 and the touch pad 101 to the main processor 103 by performing the screen control method according to the solutions of this application. In other words, the main processor 103 processes the touch data of the user generated by the touch chip 110, and after processing the touch data, the main processor 103 controls the display screen 102 to display the data frame by frame.

Figure 5B:
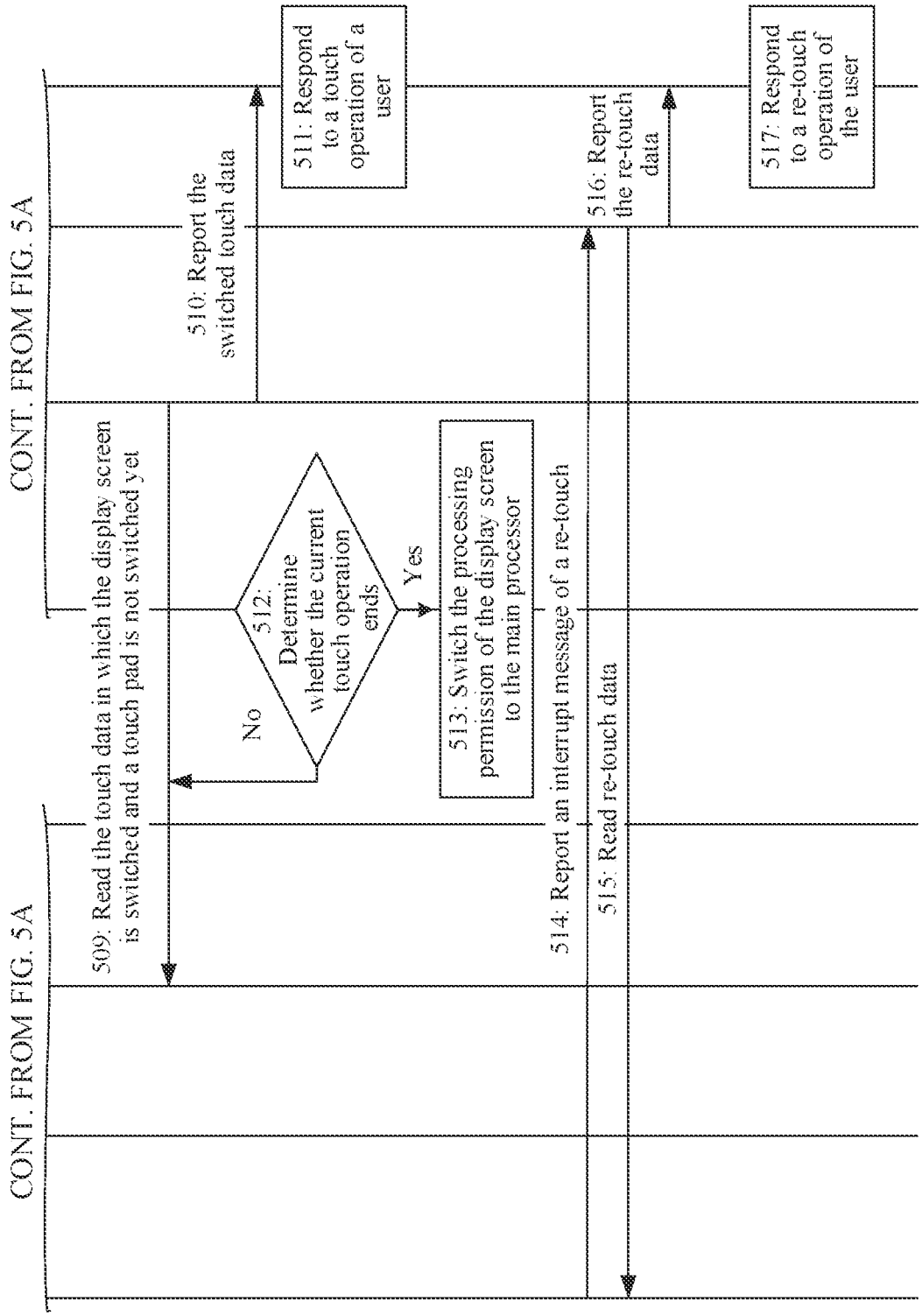

Specifically, in some embodiments, as shown in FIG. 5A and FIG. 5B, when the processing permission of the display screen 102 and the touch pad 101 is in the co-processor 104, and the co-processor 104 detects the touch operation of the user, the process of switching the processing permission of the display screen 102 and the touch pad 101 to the main processor 103 includes the following steps:

Step 501: The smartwatch 100 generates the touch data of the user. For example, in some embodiments, the user touches the screen, and the touch chip 110 generates data such as the coordinates, the pressure, the area, and the tangent value of the touch point of the user.

In addition, it may be understood that an operation of touching the smartwatch 100 by the user may be an operation such as tapping, touching and holding, double tapping, and sliding. For example, the user taps the touch pad 101 through a finger, or the finger of the user slides from one position on the touch pad 101 to another position. The touch operation performed by the user on the smartwatch 100 may be through a finger, or may be through a stylus or another touch device.

Step 502: The touch chip 110 of the smartwatch 100 reports the interrupt message to the co-touch driver 301a of the co-processor 104.

The interrupt message is a trigger signal generated when the touch chip 110 receives the touch operation of the user. If the interrupt message exists, it indicates that the user starts the touch operation on the touch pad 101, and step 503 is entered; and if there is no interrupt message, it indicates that the user does not perform the touch operation on the touch pad 101. The touch chip 110 is not triggered to generate the touch data of the user, and step 501 is returned.

Step 503: The co-touch driver 301a of the co-processor 104 reads the touch data from the touch chip 110 after receiving the interrupt message.

For example, in some embodiments, after receiving the interrupt message, the co-touch driver 301a of the co-processor 104 reads the touch data from the touch chip 110 through a serial peripheral interface (Serial Peripheral Interface, SPI).

Step 504: The co-touch driver 301a of the co-processor 104 reports the read touch data to the co-processor application layer 302a of the co-processor 104. After receiving the touch data reported by the co-touch driver 301a, the co-processor application layer 302a performs step 505.

Step 505: The co-processor application layer 302a of the co-processor 104 sends wake-up instructions to the main processor 103 after receiving the touch data. After receiving the wake-up instructions, the main processor 103 simultaneously performs step 506 and step 507.

Step 506: The main processor 103 completes power-on of the internal MIPI interface after receiving the wake-up instructions. To be specific, power-on of the hardware interface connected between the main processor 103 and the switching switch S2 of the display screen 102 is completed, so that when the switching switch S2 of the display screen 102 is switched to the main processor 103, the main processor 103 can communicate with the MIPI interface of the display screen 102 through the MIPI interface.

Step 507: The main processor 103 sends the interrupt request to the co-processor 104 to request to control the screen. To be specific, the co-processor 104 is requested to switch the processing permission of the display screen 102 and the touch pad 101 to the main processor 103.

Step 508: The co-processor 104 first switches, after receiving the interrupt request sent by the main processor 103, the processing permission of the display screen 102 to the main processor 103 in response to the interrupt request.

Figure 6:
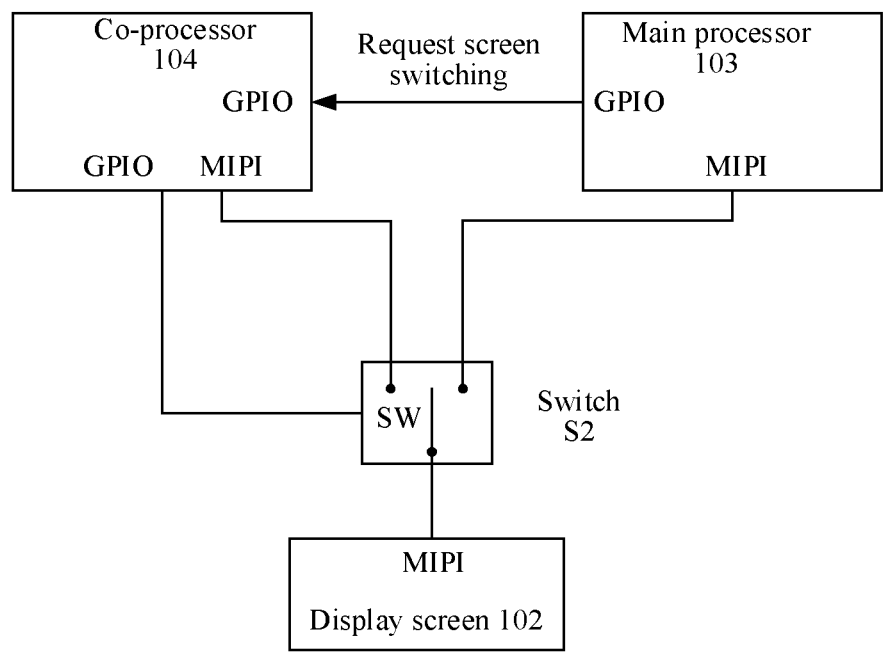
FIG. 6 is a diagram of a principle of switching a display screen by a co-processor according to some embodiments of this application.

For example, as shown in FIG. 6, the main processor 103 may pull up a level of a GPIO interface configured to send a switch request, and the co-processor 104 also pulls up a level of a GPIO interface configured to control the switching switch S2 of the display screen 102. In this case, the switching switch S2 is switched to the main processor 103. To be specific, the display screen 102 communicates with the main processor 103 through the switching switch S2, and the main processor 103 processes the related information of the display screen 102. After the processing permission of the display screen 102 is switched from the co-processor 104 to the main processor 103, step 509 is entered.

Step 509: The main virtual touch driver 301b of the main processor 103 reads the touch data of the user from the co-processor application layer 302a. The touch data of the user is the data that is generated by the touch chip 110 and that is corresponding to the user touch operation, in a process in which the processing permission of the display screen 102 is successfully switched from the co-processor 104 to the main processor 103, but the switching of the touch pad 101 has not completed, in other words, the processing permission of the display screen 102 has been switched to the main processor 103, but the processing permission of the touch pad 101 is in the co-processor 104.

It should be noted that: If the processing permission of the touch pad 101 is switched from the co-processor 104 to the main processor 103 before a complete touch operation of the user is completed, for example, before a finger of the user or a touch device held by the user is lifted from the screen, a part of the touch data of the user is lost. As a result, the main processor 103 cannot completely receive the touch data, and therefore cannot accurately parse out the user operation event corresponding to the user touch data, and further cannot accurately respond to the user operation event, so that freezing on a screen occurs in the screen switching process, and user experience is affected. Therefore, the co-processor 104 first switches the display screen 102 to the main processor 103, and then switches the touch pad 101 to the main processor 103 after a touch operation of the user is completed, in other words, after a finger of the user or a touch device held by the user is lifted from the screen, step 512 is entered.

Step 510: The main virtual touch driver 301b of the main processor 103 reports the read touch data of the user to the main processor application layer 302b.

To be specific, before the touch pad 101 switching is completed, the processing permission of the touch pad 101 remains in the co-processor 104. After the main processor 103 reads the touch data of the user from the co-processor application layer 302a through the main virtual touch driver 301b, the read touch data of the user is then reported to the main processor application layer 302b for processing.

Step 511: The main processor application layer 302b responds to the touch operation of the user after receiving the touch data of the user.

For example, in some embodiments, after receiving the touch data of the user, the main processor application layer 302b calculates the touch data, determines the touch event of the user corresponding to the touch data, and then responds according to the determined event.

For example, in some embodiments, when the main processor application layer 302b determines that the operation type of the user is that the finger of the user pressing and holding at a same, a response corresponding to the operation means that: the information in the information record of the smartwatch 100 is forwarded, added to favorites, edited, deleted, multi-selected, referenced, or the like.

Step 512: The co-processor 104 determines whether the current touch operation ends after switching the display screen 102 to the main processor 103. If the process ends, it indicates that the touch pad 101 can be switched to the main processor 103, and step 513 is entered. Otherwise, it indicates that the touch pad 101 cannot be switched to the main processor 103 temporarily, and step 509 is returned.

In some embodiments, the co-processor 104 may determine whether a touch operation ends by determining whether a difference between a time when the finger of the user leaves the screen and a time when the user starts to touch the screen is greater than a specified time threshold. For example, provided that a time threshold of a sliding operation is set to 10 milliseconds, if a time difference between the time when the finger of the user leaves the screen and the time when the user starts to touch the screen is greater than 10 milliseconds, the co-processor 104 can determine that a sliding operation ends; or the co-processor 104 determines that one sliding operation is not completed.

Step 513: The co-processor 104 switches the touch pad 101 to the main processor 103 after determining that the current touch ends.

For example, as shown in FIG. 2, the co-processor 104 controls the switching switch S1 of the touch pad 101 to switch to the main processor 103, so that the I2C interface of the touch pad 101 communicates with the I2C interface of the main processor 103, in other words, the touch pad 101 is switched to the main processor 103.

Step 514: When the main processor 103 successfully controls the screen, (to be specific, the main processor 103 processes the related information of the display screen 102 and the touch pad 101), in other words, in a case in which the processing permission of the display screen 102 and the touch pad 101 is successfully switched to the main processor 103, if the user touches the screen again, the main processor 103 reads, from the touch chip 110, touch data that is generated by the touch chip 110 and that is corresponding to the re-touch of the user.

If the user touches the screen again, the touch chip 110 of the smartwatch 100 reports the interrupt message to the main touch driver 301c of the main processor 103. The interrupt message is a trigger signal generated when the touch chip 110 receives the re-touch operation of the user. If the interrupt message exists, it indicates that the user starts the touch operation on the touch pad 101, and step 515 is entered; and if there is no interrupt message, it indicates that the user does not perform the re-touch operation on the touch pad 101. The touch chip 110 is not triggered to generate the re-touch data of the user, and the process ends.

Step 515: The main touch driver 301c of the main processor 103 reads the re-touch data from the touch chip 110 after receiving the interrupt message indicating the re-touch of the user.

For example, after receiving the interrupt message, the main touch driver 301c reads the touch data from the touch chip 110 through the serial peripheral interface (Serial Peripheral Interface, SPI).

Step 516: The main touch driver 301c of the main processor 103 reports the read re-touch data to the main processor application layer 302b for processing.

Step 517: The main processor application layer 302b responds to the re-touch operation of the user after receiving the re-touch data of the user.

For example, after receiving the re-touch data of the user, the main processor application layer 302b calculates the re-touch data, determines a touch event of the user corresponding to the re-touch data, and then responds based on the determined event. For example, the main processor application layer 302b identifies the data that the user taps on the screen, and determines that the operation of the user is continuous touching and holding by a finger of the user at different positions of the screen of the smartwatch 100. In this case, a response corresponding to the operation means that: the smartwatch 100 drags and rolls the information record, to display the information record in different time periods.

For example, after the finger of the user slides on the time interface of the smartwatch 100 shown in FIG. 4B, the main processor 103 is woken up, and the smartwatch 100 enters the desktop of the smartwatch 100 shown in FIG. 4C, where the desktop includes a plurality of application icons, such as a navigation icon, an exercise application icon, a calculator icon, a weather icon, a setting icon, and that like. In a process in which the finger of the user slides on the time interface of the smartwatch 100 shown in FIG. 4B, the smartwatch 100 switches the processing permission of the display screen 102 and the touch pad 101 to the main processor 103 by performing the screen control method shown in FIG. 5A and FIG. 5B. Then, when the user touches the screen again, the main processor 103 processes the touch data of the user generated by the touch chip 110, and controls the display screen 102 to display frame by frame.

The following describes, in a case of the main processor 103 controls the screen (in other words, the processing permission of the display screen 102 and the touch pad 101 is in the main processor 103), a process in which the user taps an icon of a set application on the desktop of the smartwatch 100, and triggers the main processor 103 to switch the processing permission of the display screen 102 and the touch pad 101 to the co-processor 104.

The set application refers to an application that needs to be processed by the co-processor 104, for example, a calculator, a timer, an alarm clock, or an exercise application that features a higher use frequency and a smaller amount of calculations. The co-processor 104 replaces the main processor 103 to process the foregoing application that is frequently used and that is used for a long time, so that power consumption can be reduced, and a battery life of the smartwatch 100 can be improved.

Figures 7A, 7B:
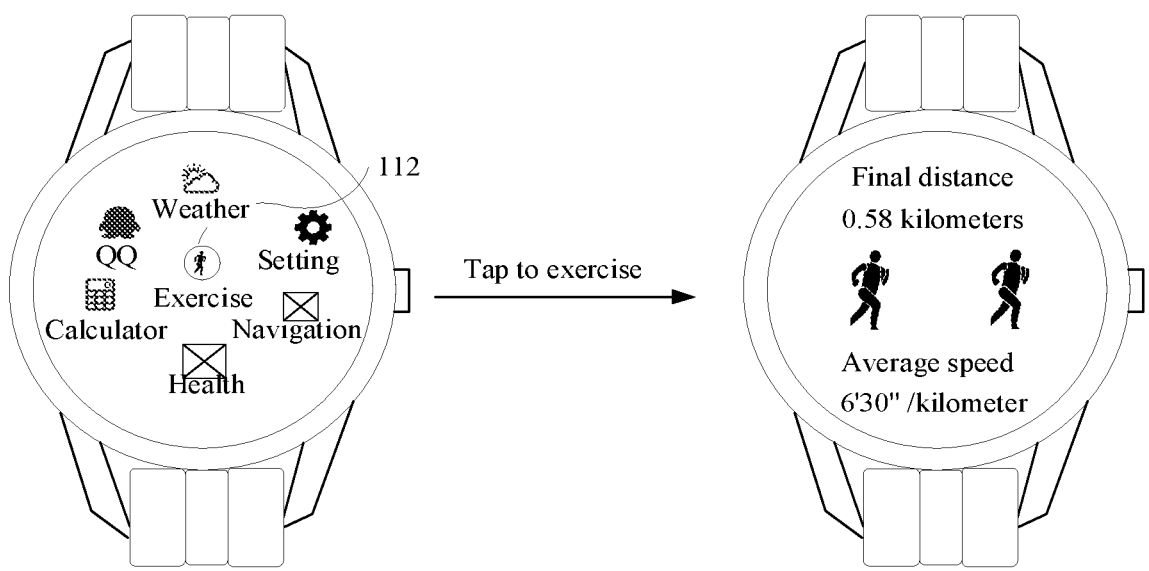
FIG. 7A is a schematic diagram of tapping an exercise application on a smartwatch desktop by a user according to some embodiments of this application.
FIG. 7B is a diagram of an interface shown after a user enters an exercise application by tapping an exercise application on a smartwatch desktop according to some embodiments of this application.

For example, in embodiments shown in FIG. 7A, the interface currently displayed on the smartwatch 100 is a desktop, and the desktop includes icons of a plurality of applications, such as a navigation icon, an exercise application icon, a calculator icon, a weather icon, a setting icon, and that like. After the user taps an icon 112 of the exercise application, the smartwatch 100 runs the exercise application, and enters an interface that is shown in FIG. 7B and that displays a mileage and a speed. However, the currently displayed interface of the user running mileage and the pace is displayed by the co-processor 104 controlling the display screen 102. Because the exercise application is run by the co-processor 104, after the user taps the icon 112 of the exercise application, the display screen 102 and the touch pad 101 of the smartwatch 100 need to be switched from the main processor 103 to the co-processor 104.

In some embodiments, applications separately executed by the main processor 103 and the co-processor 104 are shown in Table 1

TABLE 1

| Applications executed by the main processor 103 | Application executed by the co-processor 104 |
|---|---|
| Navigation | Exercise |
| Phone | Calculator |
| Chat | Clock |
| Shopping | Weather |
| Ticket | TruSleep ™ |
| Photo | Smart heart rate monitoring |
| Mobile payment | Blood oxygen saturation |

It should be noted that: applications listed in Table 1 and executed by the main processor, such as navigation, phone, chat, shopping, ticket, photo, and mobile payment, are usually third-party applications; and applications such as exercise, calculator, clock, weather, scientific sleep, smart heart rate monitoring, and blood oxygen saturation listed in Table 1 are usually applications developed by device manufacturers. It may be understood that the application names listed in Table 1 constitute no specific limitation to the solutions of this application.

Refer to FIG. 1A to FIG. (c), FIG. 2, and FIG. 6 to FIG. 8, the following describes in detail a process in which after the user taps the icon 112 of the exercise application on the desktop of the smartwatch 100, the main processor 103 is triggered to switch the processing permission of the display screen 102 and the touch pad 101 to the co-processor 104.

Figure 8:
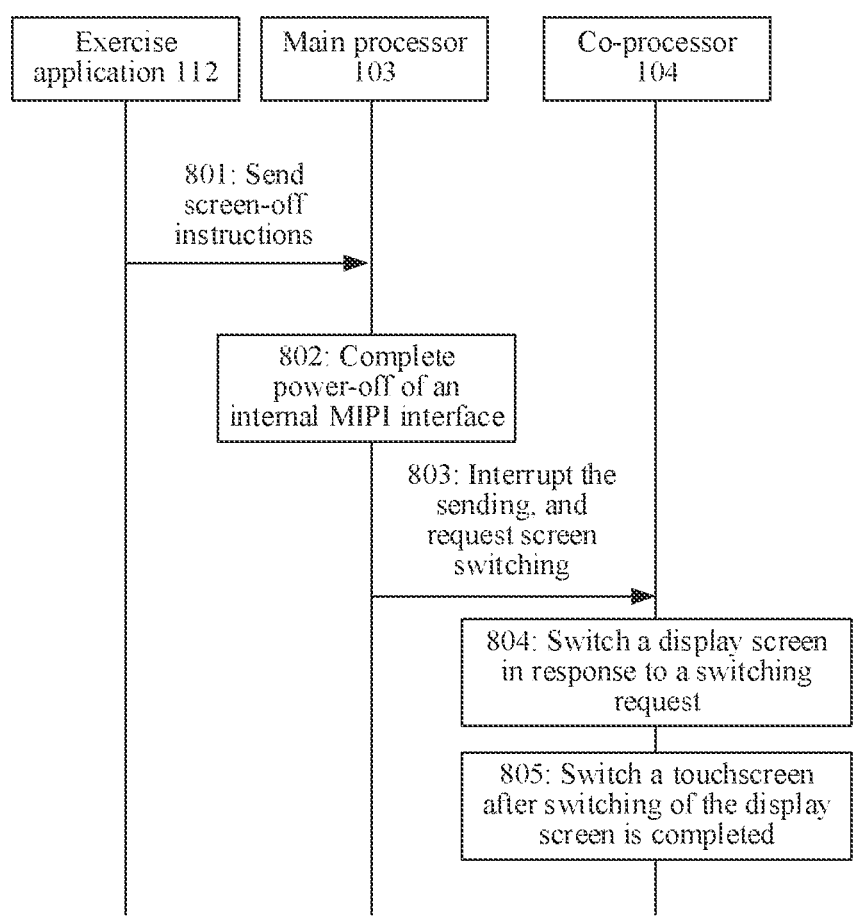
FIG. 8 is an interaction diagram of another screen switching control method provided in this application according to some embodiments of this application.

As shown in FIG. 1B, at the moment t3, after the co-processor 104 switches the processing permission of the touch pad 101 to the main processor 103, the main processor 103 processes the related information of the display screen 102 and the touch pad 101. At a moment t4, after the user taps the icon 112 of the exercise application on the desktop of the smartwatch 100, the main processor 103 is triggered to send a screen switching interrupt request to the co-processor 104, to request the co-processor 104 to control the display screen 102 and the touch pad 101. After receiving the interrupt request sent by the main processor 103, the co-processor 104, controls, in response to the interrupt request, the switching switch S2 of the display screen 102 to communicate with the co-processor 104. After the display screen 102 switching is completed, the switching switch S1 of the touch pad 101 is controlled to communicate with the co-processor 104. In this way, the main processor 103 switches the processing permission of the display screen 102 and the touch pad 101 to the co-processor 104, and the co-processor 104 is responsible for reading and processing the touch data of the user, and controlling the display screen 102 to display frame by frame. Specifically, as shown in FIG. 8, after the user taps the icon 112 of the exercise application on the desktop of the smartwatch 100, a process in which the main processor 103 switches the processing permission of the display screen 102 and the touch pad 101 to the co-processor 104 includes the following steps:

Step 801: The exercise application of the smartwatch 100 sends screen-off instructions to the main processor 103. The main processor 103 simultaneously performs step 802 and step 803 after receiving the screen-off instructions.

Step 802: The main processor 103 completes power-off of the internal MIPI interface. To be specific, power-off of the hardware interface connected to the switching switch S2 of the main processor 103 and the display screen 102 is completed, to disconnect a connection between the MIPI interface of the main processor 103 and the MIPI interface of the display screen 102.

Step 803: The main processor 103 sends an interrupt request to the co-processor 104 for screen switching, to be specific, the main processor 103 requests the co-processor 104 to switch the processing permission of the display screen 102 and the touch pad 101 from the main processor 103 to the co-processor 104.

Step 804: The co-processor 104 switches, after receiving the screen switching interrupt request, the processing permission of the display screen 102 from the main processor 103 to the co-processor 104 in response to the screen switching interrupt request.

For example, as shown in FIG. 6, the main processor 103 may pull down the level of the GPIO interface of the main processor 103 configured to send a switch request, and the co-processor 104 also pulls down the level of the GPIO interface configured to control the switching switch S2 of the display screen 102. In this case, the switching switch S2 is switched to the co-processor 104. To be specific, the display screen 102 communicates with the co-processor 104 through the switching switch S2, and the co-processor 104 processes the related information of the display screen 102.

Step 805: After the display screen 102 switching is completed, the co-processor 104 switches the processing permission of the touch pad 101 from the main processor 103 to the co-processor 104.

For example, as shown in FIG. 2, the co-processor 104 controls the switching switch S1 of the touch pad 101 to switch to the co-processor 104, so that the I2C interface of the touch pad 101 communicates with the I2C interface of the co-processor 104. Therefore, the co-processor 104 communicates with the touch pad 101, and when the user touches the screen of the smartwatch 100, the co-processor 104 reads and processes the touch data that is generated by the touch chip 110 and that corresponds to the touch operation of the user.

As described above, after the process in which the processing permission of the display screen 102 and the touch pad 101 is switched from the co-processor 104 to the main processor 103 shown in FIG. 5A and FIG. 5B, and the process in which the processing permission of the display screen 102 and the touch pad 101 is switched from the main processor 103 to the co-processor 104 shown in FIG. 8 are described, the following continues to use the smartwatch 100 as an example to describe a system interaction method according to this application. For example, the smartwatch 100 performs the system interaction method shown in FIG.

9, to implement switching between the main processor 103 and the co-processor 104 of the smartwatch 100 in different scenarios.

Figure 9:
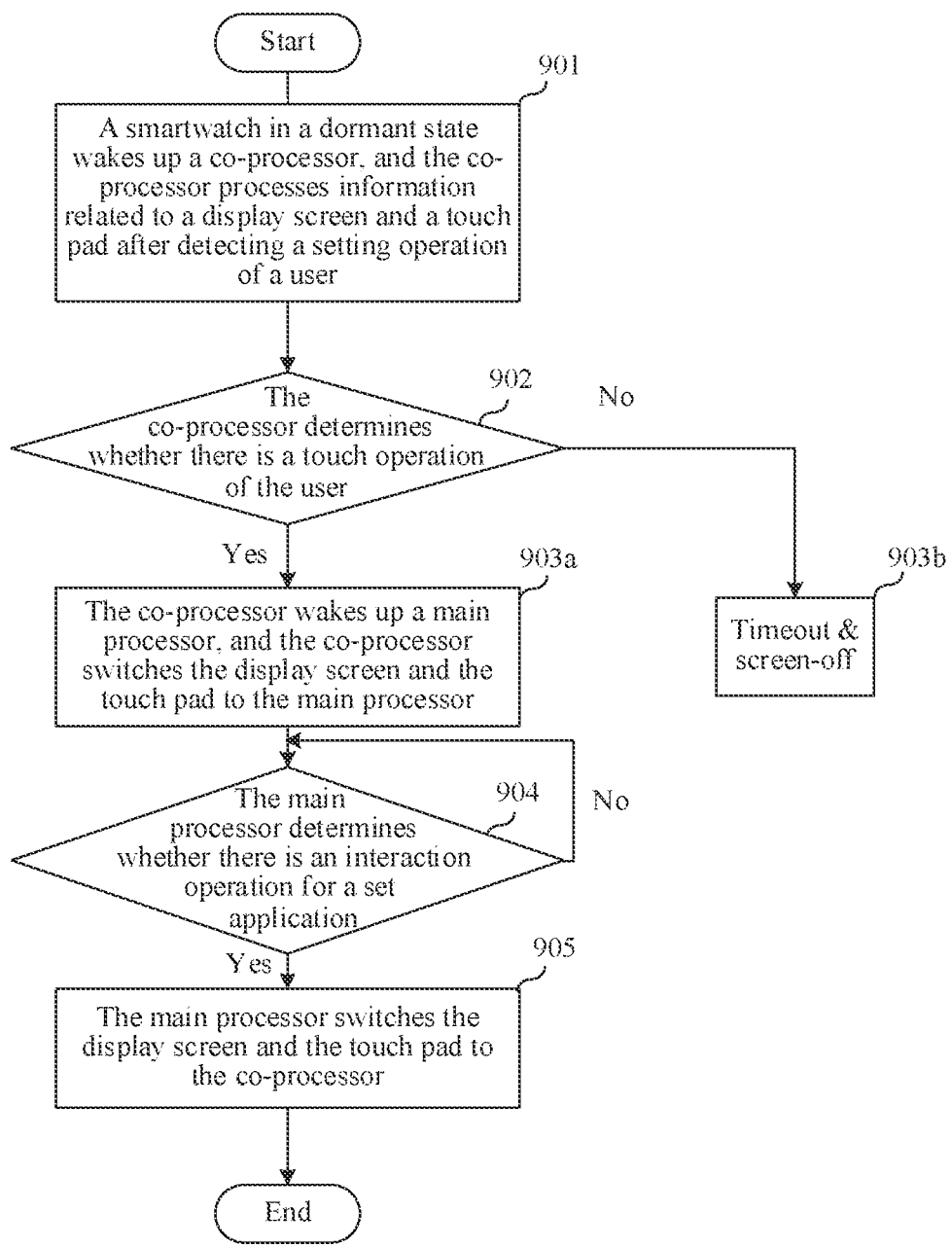
FIG. 9 is a flowchart of a system interaction method according to some embodiments of this application.

It may be understood that, when switching between the main processor 103 and the co-processor 104, the smartwatch 100 may switch the display screen 102 and the touch pad 101 from the co-processor 104 to the main processor 103 by performing, for example, the screen control method shown in FIG. 5A and FIG. 5B. In addition, the smartwatch 100 may switch the display screen 102 and the touch pad 101 from the main processor 103 to the co-processor 104 by performing, for example, the screen control method shown in FIG. 8. Specifically, as shown in FIG. 9, the system interaction method according to this application includes the following steps:

Step 901: The smartwatch 100 in the dormant state wakes up the co-processor 104, and the co-processor 104 processes information related to the display screen 102 and the touch pad 101 after detecting a setting operation of the user.

The setting operation of the user may be an operation in which the user lifts a wrist that wears the smartwatch 100, the user presses a button of the smartwatch 100, or the user indicates the smartwatch 100 to wake up through voice instructions. This is not limited in this application.

The related information of the display screen 102 and the touch pad 101 includes but is not limited to: one or more types of data, for example, touch data corresponding to a user touch operation; one or more types of instructions, for example, in an embodiment according to FIG. 5A, wake-up instructions sent by a co-processor application layer to a main processor; one or more types of messages, for example, in some embodiments according to FIG. 5A, an interrupt message sent by the touch chip 110 to the co-touch driver 301a; and one or more types of notifications, one or more types of requests, one or more types of responses, one or more types of signals, and the like.

Step 902: The co-processor 104 determines whether there is a touch operation of the user. If there is a touch operation of the user, it indicates that the co-processor 104 detects the touch operation of the user, and step 903a is entered; and If there is not a touch operation of the user, it indicates that the co-processor 104 does not detects the touch operation of the user, and step 903b is entered.

For example, in some embodiments, after the touch chip 110 detects a touch operation of the user, the touch chip 110 sends an interrupt message to the co-processor 104. The interrupt message is a trigger signal generated when the touch chip 110 receives the touch operation of the user. If the interrupt message exists, it indicates that the user starts the touch operation on the touch pad 101, and step 903a is performed; if the interrupt message does not exist, it indicates that the user does not perform the touch operation on the touch pad 101, and step 903b is entered.

Step 903a: The co-processor 104 wakes up the main processor 103, and the co-processor 104 switches the processing permission of the display screen 102 and the touch pad 101 to the main processor 103 after detecting the touch operation of the user.

For example, in some embodiments, the touch chip 110 generates touch data, and sends an interrupt message to the co-touch driver 301a of the co-processor 104. After receiving the interrupt message, the co-touch driver 301a reads the touch data from the touch chip 110, and reports the read touch data to the co-processor application layer 302a. After receiving the touch data, the co-processor application layer 302a sends wake-up instructions to the main processor 103. After receiving the wake-up instructions, the main processor 103 completes the internal power-on, and sends an interrupt request to the co-processor 104, in other words, the main processor 103 requests the co-processor 104 to switch the processing permission of the display screen 102 and the touch pad 101 to the main processor 103. After receiving the interrupt request sent by the main processor 103, the co-processor 104 first switches the display screen 102 to the main processor 103. When the display screen 102 switching is completed but the touch pad 101 is not switched temporarily, to avoid a problem of freezing on a screen in the process of screen switching, the co-processor application layer 302a sends the touch data to the main virtual touch driver 301b of the main processor 103. After the current touch of the user ends, the co-processor 104 switches the touch pad 101 to the main processor 103. For a detailed process, refer to the foregoing text description of the part of the screen control method shown in FIG. 5A and FIG. 5B. Details are not described herein again.

Step 903b: The smartwatch 100 turns off the screen due to timeout. After the co-processor 104 is woken up, if no touch operation of the user is detected within a set time, the co-processor 104 sends screen-off instructions to the display screen 102, to control the display screen 102 to turn off the screen. For example, after being woken up, the co-processor 104 controls the display screen 102 to light up, with no touch operation of the user being detected within 5 seconds. In this case, the co-processor 104 enters the dormant state. The main processor 103 continues to stay in the dormant state, and the display screen 102 turns off.

Step 904: The main processor 103 determines whether there is an interaction operation for the set application. If there is an interaction operation for the set application, it indicates that the main processor 103 detects the interaction operation performed by the user on the set application, and step 905 is entered; otherwise, it indicates that the main processor 103 does not detect the interaction operation of the user for the set application. In some embodiments, if the operation of the user is not detected within the set time, the main processor 103 turns off the screen due to timeout.

The set application refers to an application that needs to be processed by the co-processor 104, for example, a calculator, a timer, an alarm clock, or an exercise application that features a higher use frequency and a smaller amount of calculations. The co-processor 104 replaces the main processor 103 to process the foregoing application that is frequently used and that is used for a long time, so that power consumption can be reduced, and a battery life of the smartwatch 100 can be improved.

Step 905: The main processor 103 wakes up the co-processor 104, and the main processor 103 switches the display screen 102 and the touch pad 101 to the co-processor 104.

For example, the user taps an exercise application of the smartwatch 100, and the exercise application of the smartwatch 100 sends screen-off instructions to the main processor 103. After receiving the screen-off instructions, the main processor 103 completes power-off of the internal MIPI interface, to be specific, power-off of the hardware interface connected to the switching switch S2 of the main processor 103 and the display screen 102 is completed, to disconnect a connection between the MIPI interface of the main processor 103 and the MIPI interface of the display screen 102. In addition, the main processor 103 sends an interrupt request to the co-processor 104 for screen switching, to be specific, request to switch the display screen 102 and the touch pad 101. The co-processor 104 switches the display screen 102 in response to the screen switching interrupt request. After the display screen 102 switching is completed, the touch pad 101 is switched. For a detailed process, refer to the foregoing text description of the part of the screen control method shown in FIG. 8. Details are not described herein again.

The embodiments disclosed in this application may be implemented in hardware, software, firmware, or a combination of these implementation methods. Embodiments of this application may be implemented as a computer program or program code executed in a programmable system. The programmable system includes at least one processor, a storage system (including a volatile memory, a nonvolatile memory, and/or a storage element), at least one input device, and at least one output device.

The program code may be applied to input instructions to perform the functions described in this application and generate output information. The output information may be applied to one or more output devices in a known manner. For purposes of this application, a processing system includes any system having a processor such as a digital signal processor (Digital Signal Processor, DSP), a microcontroller, an application specific integrated circuit (Application Specific Integrated Circuit, ASIC), or a microprocessor.

The program code may be implemented in a high-level programming language or an object-oriented programming language to communicate with the processing system. The program code can also be implemented in an assembly language or a machine language when needed. The mechanisms described in this application are not limited to the scope of any particular programming language. In either case, the language may be a compiled language or an interpreted language.

In some cases, the disclosed embodiments may be implemented in hardware, firmware, software, or any combination thereof. The disclosed embodiments may also be implemented as instructions carried by or stored thereon by one or more temporary or non-transitory machine-readable (for example, computer-readable) storage media, which may be read and executed by one or more processors. For example, instructions can be distributed over a network or through other computer-readable medium. Accordingly, a machine-readable medium may include any mechanism for storing or transmitting information in a form readable by a machine (for example, a computer), including, but not limited to, a floppy disk, an compact disk, an optical disk, a read-only memory (CD-ROM), magneto-optical disks, a read-only memory (Read Only Memory, ROM), a random access memory (Random access memory, RAM), an erasable programmable read-only memory (Erasable Programmable Read-Only Memory, EPROM), an electrically erasable programmable read-only memory (Electrically Erasable Programmable Read-Only Memory, EEPROM), a magnetic or optical card, a flash memory, or a tangible machine-readable memory configured to transmit information through the Internet with transmitting signals (for example, a carrier wave, an infrared signal and a digital signal) in electrical, optical, acoustic or other forms. Thus, a machine-readable medium includes any type of machine-readable medium suitable for storing or transmitting electronic instructions or information in a form that is readable by a machine (for example, a computer).

In the drawings, some structural or method features may be shown in a particular arrangement and/or sequence. However, it should be understood that such a specific arrangement and/or sequence may not be required. Rather, in some embodiments, the features may be arranged in a manner and/or order other than shown in the illustrative drawings. In addition, the inclusion of structural or method features in a particular figure is not meant to imply that such features are required in all embodiments, and in some embodiments, these features may not be included or may be combined with other features.

It should be noted that: All units/modules mentioned in the device embodiments of this application are logical units/modules. Physically, one logical unit/module may be one physical unit/module, or may be a part of one physical unit/module, or may be implemented through a combination of a plurality of physical units/modules. Physical implementations of these logical units/modules are not the most important, and a combination of functions implemented by these logical units/modules is a key to resolving the technical problem raised in this application. In addition, to highlight the innovative part of this application, the foregoing device embodiments of this application do not introduce a unit/module that is not closely related to resolving the technical problem proposed in this application. This does not indicate that no other unit/module exists in the foregoing device embodiments.

It should be noted that: In the examples and specification of this patent, relational terms such as first and second are merely used to distinguish one entity or operation from another, and do not necessarily require or imply any such actual relationship or order between these entities or operations. In addition, the term "include", "include", or any other variant is intended to cover non-exclusive include, so that a process, a method, an article, or a device that includes a series of elements and that not only includes such elements, but also includes other elements not explicitly listed, or may further include elements inherent in the process, the method, the article, or the device. Without further limitations, an element limited by "include a/an" does not exclude other same elements existing in the process, the method, the article, or the device which includes the element.

Although this application has been illustrated and described with reference to some preferred embodiments of this application, it should be understood by a person of ordinary skill in the art that various changes may be made thereto in form and detail without departing from the spirit and scope of this application.

What is claimed is:

1. A screen control method comprising:
processing, by a second processor of an electronic device, related information of a display screen and a touch pad;
detecting a start of a first touch operation by a user;
detecting first touch data of the first touch operation, wherein the first touch operation is a continuous touch operation;
switching, when detecting the start of the first touch operation, processing permission of the display screen from the second processor to a first processor;
sending, after switching the processing permission of the display screen, the first touch data to the first processor through the second processor;
detecting an end of the first touch operation; and
switching, when detecting the end of the first touch operation, processing permission of the touch pad from the second processor to the first processor.

2. The method of claim 1, further comprising:
sending, using the second processor, the first touch data to a virtual touch driver; and
receiving, by the first processor through the virtual touch driver, the first touch data.

3. The method of claim 1, wherein switching the processing permission of the display screen from the second processor to the first processor comprises:
sending, when detecting that start of the first touch operation, wake-up instructions to the first processor through the second processor;
sending, by the first processor in response to receiving the wake-up instructions, a screen switching interrupt request to the second processor; and
switching, by the second processor after receiving the screen switching interrupt request, the processing permission of the display screen from the second processor to the first processor in response to the interrupt request.

4. The method of claim 1, further comprising:
processing, by the first processor, the related information of the display screen and the touch pad;
detecting the user performing an interaction operation on a specified application of the electronic device;
switching, when detecting the interaction operation, the processing permission of the display screen and the touch pad from the first processor to the second processor; and
processing, by the second processor, the related information of the display screen and the touch pad.

5. The method of claim 1, further comprising:
processing, by the first processor, the related information of the display screen and the touch pad;
detecting a second touch operation; and
sending, when detecting the second touch operation, second touch data of the second touch operation to the first processor.

6. The method of claim 1, further comprising switching, when detecting the start of the first touch operation, the processing permission of the display screen from the second processor to the first processor by:
controlling, when detecting the start of the first touch operation, a display screen switching switch of the electronic device to disconnect from the second processor; and
controlling the display screen switching switch to communicate with the first processor.

7. The method of claim 1, further comprising switching, when detecting the end of the first touch operation, the processing permission of the touch pad from the second processor to the first processor by:
controlling, when detecting the end of the first touch operation, a touch pad switching switch of the electronic device to disconnect from the second processor; and
controlling the touch pad switching switch to communicate with the first processor.

8. An electronic device, comprising:
a screen comprising a display screen and a touch pad;
a memory configured to store instructions; and
one or more processors coupled to the screen and the memory, wherein the one or more processors comprise:
a first processor; and
a second processor configured to cooperate with the first processor to execute the instructions to cause the electronic device to:
process, by the second processor, related information of the display screen and the touch pad;
detect a start of a first touch operation by a user;
detect first touch data of the first touch operation, wherein the first touch operation is a continuous touch operation;
switch, when detecting the start of the first touch operation, processing permission of the display screen from the second processor to the first processor;
send the first touch data to the first processor through the second processor;
detect an end of the first touch operation; and
switch, when detecting the end of the first touch operation, processing permission of the touch pad from the second processor to the first processor.

9. The electronic device of claim 8, further comprising a virtual touch driver configured to:
receive the first touch data from the second processor; and
send the first touch data to the first processor.

10. The electronic device of claim 8, wherein switching the processing permission of the display screen from the second processor to the first processor comprises:
sending, when detecting the start of the first touch operation, wake-up instructions to the first processor through the second processor;
sending, by the first processor after receiving the wake-up instructions, a screen switching interrupt request to the second processor; and
switching, by the second processor after receiving the screen switching interrupt request, the processing permission of the display screen from the second processor to the first processor.

11. The electronic device of claim 8, wherein the one or more processors are further configured to execute the instructions to cause the electronic device to:
process, by the first processor, the related information of the display screen and the touch pad;
detect the user performing an interaction operation on a specified application of the electronic device;
switch, when detecting the interaction operation, the processing permission of the display screen and the touch pad from the first processor to the second processor; and
process, by the second processor of the electronic device, the related information of the display screen and the touch pad.

12. The electronic device of claim 8, wherein the one or more processors are further configured to execute the instructions to cause the electronic device to:
process, by the first processor, the related information of the display screen and the touch pad;
detect a second touch operation; and
send, when detecting the second touch operation, second touch data of the second touch operation to the first processor.

13. The electronic device of claim 8, further comprising a display screen switching switch electrically connected to the display screen, wherein when detecting the start of the first touch operation, the electronic device switches the processing permission of the display screen from the second processor to the first processor by:
controlling, when detecting the start of the first touch operation, the display screen switching switch to disconnect from the second processor; and
controlling the display screen switching switch to communicate with the first processor.

14. The electronic device of claim 8, further comprising a touch pad switching switch electrically connected to the touch pad, wherein when detecting the end of the first touch operation, the electronic device switches the processing permission of the touch pad from the second processor to the first processor by:

controlling, when detecting the end of the first touch operation, the touch pad switching switch to disconnect from the second processor; and controlling the touch pad switching switch to communicate with the first processor.

15. A computer program product comprising instructions that are stored on a non-transitory computer-readable medium and that, when executed by one or more processors, cause an electronic device to:

process, by a second processor of the electronic device, related information of a display screen and a touch pad;

detect a start of a first touch operation by a user;

detect first touch data of the first touch operation, wherein the first touch operation is a continuous touch operation;

switch, when detecting the start of the first touch operation, processing permission of the display screen from the second processor to a first processor;

send the first touch data to the first processor through the second processor;

detect an end of the first touch operation; and switch, when detecting the end of the first touch operation, processing permission of the touch pad from the second processor to the first processor.

16. The computer program product of claim 15, wherein the instructions, when executed by the one or more processors, further cause the electronic device to:

send, through the second processor, the first touch data of the first touch operation to a virtual touch driver of the electronic device; and receive, by the first processor through the virtual touch driver, the first touch data.

17. The computer program product of claim 15, wherein switching the processing permission of the display screen from the second processor to the first processor comprises:

sending, when detecting the start of the first touch operation, wake-up instructions to the first processor through the second processor;

sending, by the first processor in response to receiving the wake-up instructions, a screen switching interrupt request to the second processor; and switching, by the second processor in response to receiving the screen switching interrupt request, the processing permission of the display screen from the second processor to the first processor.

18. The computer program product of claim 15, wherein the instructions, when executed by the one or more processors, further cause the electronic device to:

process, by the first processor, the related information of the display screen and the touch pad;

detect the user performing an interaction operation on a specified application of the electronic device;

switch, when detecting the interaction operation, the processing permission of the display screen and the touch pad from the first processor to the second processor; and process, by the second processor, the related information of the display screen and the touch pad.

19. The computer program product of claim 15, wherein the instructions, when executed by the one or more processors, further cause the electronic device to:

process, by the first processor, the related information of the display screen and the touch pad;

detect a second touch operation; and send, when detecting the second touch operation, second touch data of the second touch operation to the first processor.

20. The computer program product of claim 15, wherein the instructions, when executed by the one or more processors, further cause the electronic device to switch the processing permission of the display screen from the second processor to the first processor by:

controlling, when detecting the start of the first touch operation, a display screen switching switch of the electronic device to disconnect from the second processor; and controlling the display screen switching switch to communicate with the first processor.

* * * * *